(12) United States Patent
Gao et al.

(10) Patent No.: US 9,438,481 B2
(45) Date of Patent: Sep. 6, 2016

(54) SAMPLE DRIVEN VISUAL PROGRAMMING SYSTEM FOR NETWORK MANAGEMENT

(71) Applicants: Lingping Gao, Burlington, MA (US); Guangdong Liao, Toronto (CA)

(72) Inventors: Lingping Gao, Burlington, MA (US); Guangdong Liao, Toronto (CA)

(73) Assignee: NETBRAIN TECHNOLOGIES, INC, Burlington, MA (US)

(*) Notice: Subject to any disclaimer, the term of this patent is extended or adjusted under 35 U.S.C. 154(b) by 509 days.

(21) Appl. No.: 13/842,024

(22) Filed: Mar. 15, 2013

(65) Prior Publication Data

US 2014/0280831 A1 Sep. 18, 2014

(51) Int. Cl.
*G06F 15/173* (2006.01)
*H04L 12/24* (2006.01)

(52) U.S. Cl.
CPC ............... *H04L 41/22* (2013.01); *H04L 41/20* (2013.01)

(58) Field of Classification Search
CPC .................................................. H04L 41/22
USPC ............................................................ 709/223
See application file for complete search history.

(56) References Cited

U.S. PATENT DOCUMENTS

| | | | | |
|---|---|---|---|---|
| 6,286,035 B1* | 9/2001 | Gillis | ............... | H04L 69/329 709/206 |
| 6,909,708 B1* | 6/2005 | Krishnaswamy et al. | .... | 370/352 |
| 7,082,464 B2* | 7/2006 | Hasan | ................ | H04L 41/0213 709/202 |
| 7,219,339 B1* | 5/2007 | Goyal et al. | ................... | 717/143 |
| 7,254,778 B2* | 8/2007 | Dikhit | .................... | H04L 41/12 709/223 |
| 7,721,304 B2* | 5/2010 | Datla et al. | ................... | 719/328 |
| 7,742,459 B2* | 6/2010 | Kwan et al. | ................... | 370/351 |
| 7,783,733 B1* | 8/2010 | Yip et al. | ...................... | 709/223 |
| 7,908,594 B2* | 3/2011 | Varanasi | ............ | H04L 41/0226 707/760 |
| 8,266,264 B2* | 9/2012 | Hasan | ................ | H04L 41/0213 709/220 |
| 8,386,593 B1* | 2/2013 | Gao et al. | ...................... | 709/223 |
| 8,386,937 B1* | 2/2013 | Gao et al. | ...................... | 715/736 |
| 8,549,499 B1* | 10/2013 | Ding et al. | .................... | 717/149 |
| 8,943,184 B2* | 1/2015 | Kothe | ................. | H04L 41/0266 709/223 |
| 2002/0152305 A1* | 10/2002 | Jackson et al. | ............... | 709/224 |
| 2002/0198974 A1* | 12/2002 | Shafer | ........................... | 709/223 |
| 2003/0009430 A1* | 1/2003 | Burkey et al. | ..................... | 707/1 |
| 2003/0033588 A1* | 2/2003 | Alexander | ..................... | 717/107 |
| 2003/0135758 A1* | 7/2003 | Turner | ......................... | 713/201 |
| 2004/0024865 A1* | 2/2004 | Huang et al. | .................. | 709/224 |
| 2005/0005266 A1* | 1/2005 | Datig | ............................ | 717/136 |
| 2005/0060693 A1* | 3/2005 | Robison et al. | ............. | 717/143 |
| 2005/0165597 A1* | 7/2005 | Nightingale | .................... | 703/27 |
| 2005/0243066 A1* | 11/2005 | Li | ....................... | G06F 9/45512 345/168 |
| 2006/0004745 A1* | 1/2006 | Kuhn et al. | ........................ | 707/4 |
| 2006/0036612 A1* | 2/2006 | Harrop et al. | ................ | 707/100 |
| 2006/0282453 A1* | 12/2006 | Tjong et al. | ................... | 707/102 |
| 2007/0006179 A1* | 1/2007 | Tjong et al. | ................... | 717/136 |
| 2007/0011348 A1* | 1/2007 | Bansal | .................... | H04L 45/60 709/238 |
| 2007/0101273 A1* | 5/2007 | Lin et al. | ....................... | 715/738 |
| 2007/0130112 A1* | 6/2007 | Lin | .................................. | 707/2 |
| 2007/0169008 A1* | 7/2007 | Varanasi et al. | .............. | 717/136 |
| 2007/0283328 A1* | 12/2007 | Javed et al. | ................... | 717/127 |
| 2009/0216867 A1* | 8/2009 | Pusateri | ................ | H04L 41/022 709/222 |
| 2009/0288065 A1* | 11/2009 | Nathan et al. | ................ | 717/107 |
| 2012/0173691 A1* | 7/2012 | Kothe | ................. | H04L 41/0266 709/223 |
| 2013/0067018 A1* | 3/2013 | Reynolds et al. | ............ | 709/212 |
| 2013/0073486 A1* | 3/2013 | Petrick | ............................ | 706/12 |
| 2013/0290224 A1* | 10/2013 | Crowns et al. | .................. | 706/12 |
| 2014/0040710 A1* | 2/2014 | Smith | ........................... | 715/201 |
| 2014/0207840 A1* | 7/2014 | Smith et al. | .................. | 709/201 |
| 2014/0258985 A1* | 9/2014 | Yawn et al. | ................... | 717/125 |

* cited by examiner

*Primary Examiner* — Kevin Bates
*Assistant Examiner* — Clarence McCray
(74) *Attorney, Agent, or Firm* — Jie Tan; JT Law Services, PC

(57) ABSTRACT

Methods and system for sample-driven visual programming system. A Parser Utility and a Trigger Utility are provided. The Parser is defined based on a sample output from a device in real time, and data are parsed into a set of variables. The Trigger Utility visually displays the set of variables and automatically encodes a set of logic loops to analyze the data. A network engineer is therefore liberated from writing scripts for network data analysis. A system is provided to run in debugging mode for visually debugging the automatically generated programs.

19 Claims, 13 Drawing Sheets

SAMPLE DRIVEN VISUAL PROGRAMMING SYSTEM FOR NETWORK MANAGEMENT

BACKGROUND

The present application relates to network management, and more particularly to a visual programming system for network management.

Note that the points discussed below may reflect the hindsight gained from the disclosed inventions, and are not necessarily admitted to be prior art.

In the modern computer age, businesses rely on an electronic network to function properly. Networks are getting more and more complex but network engineers still depend on the traditional methods and tools, such as the text-based command-line interface (CLI), to manage their networks. To troubleshoot a network problem or to simply verify if a network functions, a network engineer still needs to manually log in to each of the network devices and issue a CLI command to gather the data, manually parse and analyze each of the output for key data, and manually eliminate each of the possible problem causes.

For each of the enterprises across the vast network world, this process may be repeated again and again, without any benefit from learning past lessons or from other people's experiences. This process is a waste of time and energy for an engineer, and certainly a waste of a company's sparse resources.

To further complicate this already tangled process, many vendors and models of network hardware devices that exist in today's network, are providing different sets of CLI commands which output many different formats of data information. It is difficult, if not impossible, for a network engineer to simplify this process by writing a simple executable program to retrieve, parse and analyze the output data of each of these different devices. It is even more challenging to require a network engineer to master a programming language in a short time, and apply such skills in a reliable manner.

There is an urgent need to find a universal solution to be able to parse and analyze data outputs of different devices from various vendors. There is an urgent need for a network management system that guides a network engineer through visual user interfaces and samples, and enables him to customize their data analysis without having to master a programming language.

SUMMARY

The present application discloses a new approach and system for network output data retrieval and data analyses. The system uses a sample-driven model which enables a user to visually define a Parser utility with any sample output for any device from any vendor. The data control and flow are visible from the user interface and most of the logic loop controls are automatically implemented. Such Parser Utility in combination with a Trigger Utility to take the result of the Parser Utility as input Variables provides a uniform and ubiquitous way of parsing and analyzing various data output in any format.

In one embodiment, a Graphic User Interface (GUI) based network system is provided, where a sample output of a device is collected and saved. A sample data format from a device may be collected in real time and be used for defining a Parser and subsequent automation of a process.

In one embodiment, a collected sample data output is used for defining a Keyword Parser, wherein the selected Keyword from the sample data output is used as a marker in collecting data adjacent to such marker into variables to be used for data analysis in subsequent Trigger functions.

In one embodiment, a collected sample data output is used for defining a Paragraph Parser, wherein the selected text pattern is used as a marker for identifying the beginning and the end of a paragraph of a similar data output, and each of the paragraphs can be further parsed with Child Parsers to collect data into a Table of Variables (two dimensional array), to be used in subsequent Trigger functions.

In one embodiment, a collected sample data output is used for defining a Table Parser which uses the text of the headers of the table in the sample output as marker to identify values in similar tables and to collect such data into a Table of Variables, to be used in subsequent Trigger functions.

In one embodiment, a collected sample data output is used for defining a Filter Parser, wherein the text pattern is used for identifying the beginning and end of the partial data, which is saved as a Filter Variable for subsequent Trigger functions.

In one embodiment, the parsed variables are visually available in defining Trigger Utilities, a user need only specify simple functions to provide data analyses for these data values and generate data reports.

In one embodiment, visual hints and suggestions are provided in the Trigger Utilities where a network engineer has the convenience of simply deciding which variable to analyze and what to see, without worrying about any underlying logic loop controls.

The inventions provide GUI to write executable applications so that a user without any programming background can write a Procedure. After a network application is created, it can be run in NETBRAIN™ Workstation in connection with any network system. From start to finish, troubleshooting with the proposed solution may just take a few minutes instead of hours or days traditionally.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
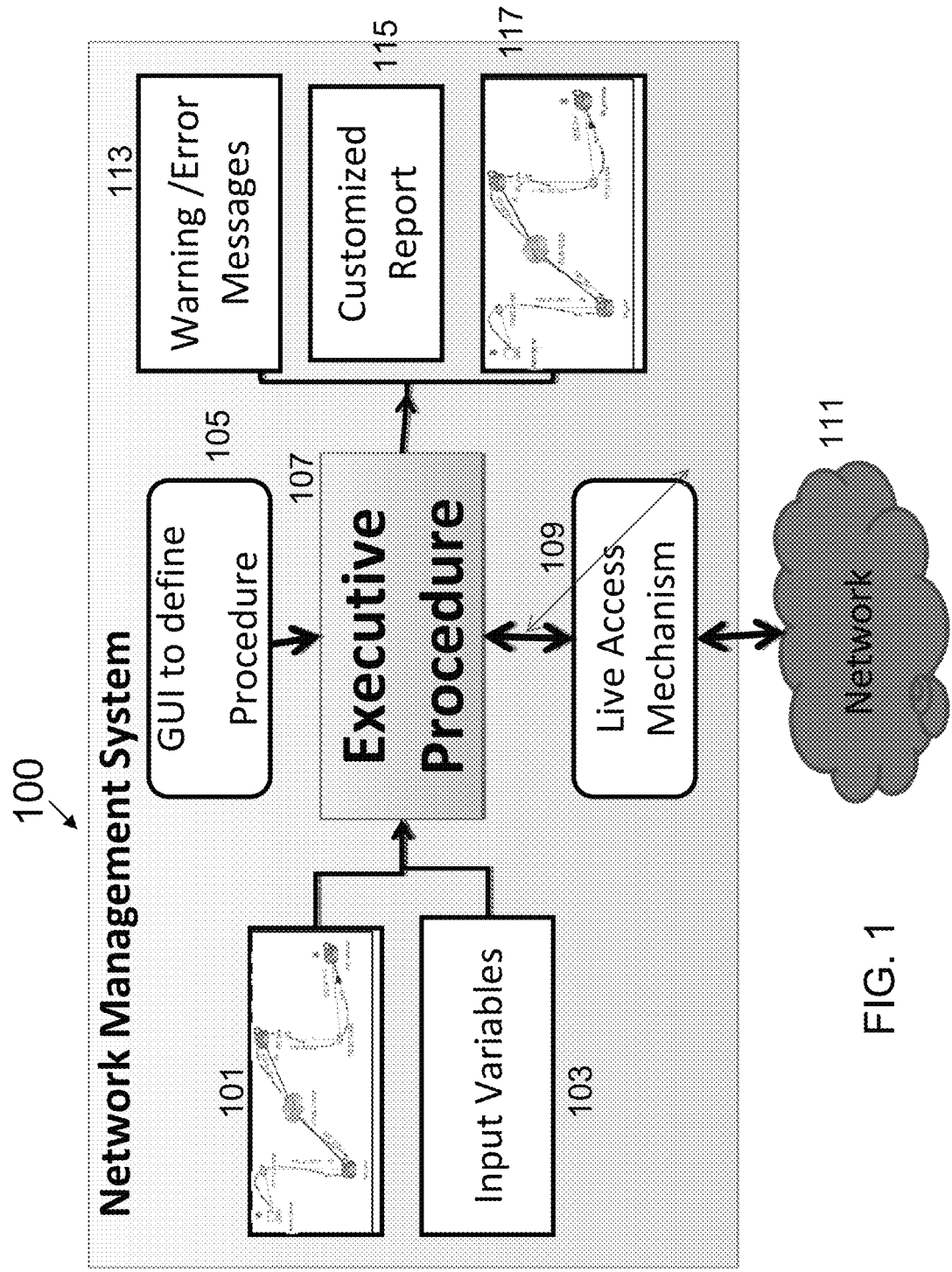
FIG. 1 illustrates an example set of relevant components of a network management system on which Executable Procedures are defined and run, in accordance to this application.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The present application may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present invention may employ any number of conventional techniques for data transmission, signaling, data processing, network control, and the like.

A particularly powerful tool for understanding network behavior is graphic visualization. According to one embodiment, a graphical representation of the network may be output to a display screen, printer, plotter, or the like. Background technologies and terminologies are further described in U.S. Pat. No. 8,386,593, the content of which is incorporated by reference.

For network troubleshooting, a network engineer depends on a set of commonly used commands, methods and tools, standard or proprietary of the manufacturers:

The Command Line Interface (CLI): almost all network devices provide CLI commands to check the network status or statistics. For example, with Cisco IOS switch, the command "show interface" can be used to show the interface status, such as input errors.

Ping: the simple tool used to check whether a device can be reachable from another device. For example, after a network change, it is the best practice to ping the main servers from the core network devices to prevent any major outage of key applications.

Traceroute: the tool to check the route to a destination from a device. This tool is useful to troubleshoot a connectivity problem.

Configuration management: a system used to find the difference in configurations of network devices in a certain period. This is important since about half of the network problems are caused by configuration changes.

Troubleshooting procedures, usually provided by the hardware vendor or the expert in the field, generally comprises the following sequences of actions:

Issue the CLI, ping, traceroute or other commands from the network devices;
Find the key value from the command output;
Compare the key value with a standard value;
Take different actions depending on the key value. For example, issue other commands to further troubleshooting, find the root cause or escalate the issue.

However, each of these steps is generally performed manually on network devices one at a time. No tools are yet available to simplify the tedious manual and error-prone steps of the various network commands and executable procedures.

With the present invention, an Executable Procedure is invented to automate these steps: collect the data from the network device, parse the data, analyze the data, provide the expert device and output the error or warning messages. The system includes a graphic user interface (GUI) to define an executable Procedure. This GUI provides an easy way to define the Procedure so that a user without any programming knowledge can create a Procedure. After a Procedure is saved, the system creates a standalone application containing the executable codes. An exemplary implementation is done by the Python Script, though any type of programming language can be used to transfer the procedure defined through the GUI to executable codes.

A "Probe" is a set of functions that retrieves and parses the data from a device.

A "Trigger" is a set of functions that defines the logic to analyze the data.

A "Process Node" is a visual representation of a block of executable codes that generally include zero to multiple "Probes" and "Triggers".

There are four types of Probes: CLI Command Probe runs CLI commands, and parses and analyzes the result; Configuration Probe analyzes the configurations; Ping Probe checks the connectivity between the devices; Traceroute Probe runs the traceroute between two devices.

An "Executable Procedure" (also called "Procedure") is a set of processes and strategies to achieve a result which can be presented visually through GUI. It may contain multiple Process Nodes and logical workflows from one Process Node to another.

A "Parser" is a set of functions that define how to retrieve data from an output of an execution of a CLI, ping, traceroute and other types of commands. Depending on the output formats, for example, four types of Parsers are provided: Keyword, Paragraph, Table and Filter Parsers.

A "Sample Output" is an output of a command executed in a target device. A Sample Output can be generated in real time on real devices at the time of troubleshooting. In order to provide correct data analysis, a network professional is guided to collect a Sample Output on a device and use this Sample Output to define a set of Parsers for subsequent data analysis.

The configured and saved Executable Procedures automate conventional troubleshooting steps. With the GUI based network management system, NETBRAIN™ Workstation, an Executable Procedure can perform the following tasks automatically:

Issue the command (CLI command/ping/traceroute/SNMP) in network devices and collect the output via a Probe;

Parse the command output to retrieve the key data via a Parser;

Analyze the key data via a Trigger;

Output the possible errors or warnings and expert advice via a GUI.

Create the maps and/or the documents for an underlying network system or a troubleshooting process.

In reference to FIG. 1, a GUI based network management system 100 is shown. The system includes a GUI 105 to define an Executable Procedure 107. The Executable Procedure is defined by a set of visual block-based programming interfaces so that a user without programming background can still effectively program his know-how. After a Procedure is saved, the system creates a standalone application containing the executable codes. An exemplary implementation is done by Python Script, though any other type of programming language can be used to transfer the procedure defined through the GUI to executable codes.

Executable Procedure 107 can be executed within a network map 101. A common use case is: a user creates a map 101 to include the network devices and/or network interfaces relevant to a network task, and then selects the relevant Procedures to run. Executable Procedures can also take the user input 103 through a user interface. While a Procedure is performed, it collects data from the various types of network devices in the live network 111 via the Live Access Mechanism 109. The output of an Executable Procedure includes warning or error messages (113), customized reports (115) and maps (117) with the problem area being highlighted or noted.

Figure 2:
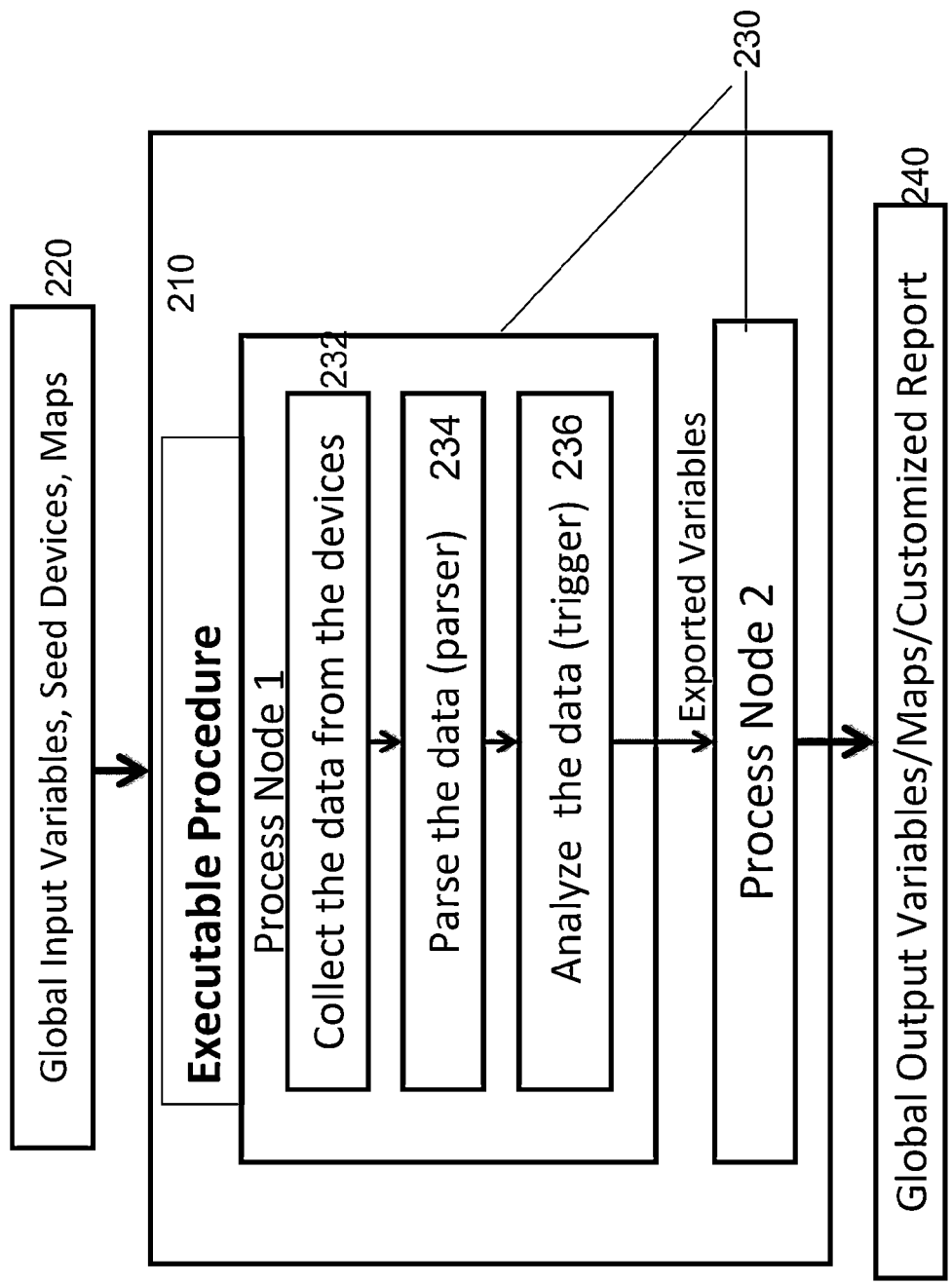
FIG. 2 shows an example control and data flows of an Executable Procedure in accordance to this application.

FIG. 2 shows an example control and data flow of an Executable Procedure. An Executable Procedure takes a network map, global input variables and/or seed devices (220) as the input. The seed devices are network devices on which a user selects to run. When the procedure is run within a map, all devices in the map are automatically selected as the seed devices.

An Executable Procedure has one or multiple Process Nodes 230. A Process Node performs three basic tasks: collect data from the network devices using commands defined by the user (step 232); parse the command output to retrieve the data (step 234); and analyze the data (step 236). The data retrieved from a Parser are stored in computer variables.

The utility component that defines how to parse a command output is called a Parser. The system provides a sample guided method to configure a Parser. The parsed data are stored in variables and passed to another utility component, Trigger for analyses. A Trigger loops through all the value-loaded variables to explain and understand the data saved in the variables, as specified by a user.

A Trigger allows a user to easily define data control flow loops as follows:

```
if ($var1 > threshold1)
    action block 1
else
    action block 2
```

Inside each of the action blocks are actions to perform under each condition, which creates the desired output for this Process Node. The action blocks can include multiple messages, expert advice, statement blocks, export variable blocks and control action Probes, etc. The outputs of an Executable Procedure 240 are created by the action blocks.

Figure 3:
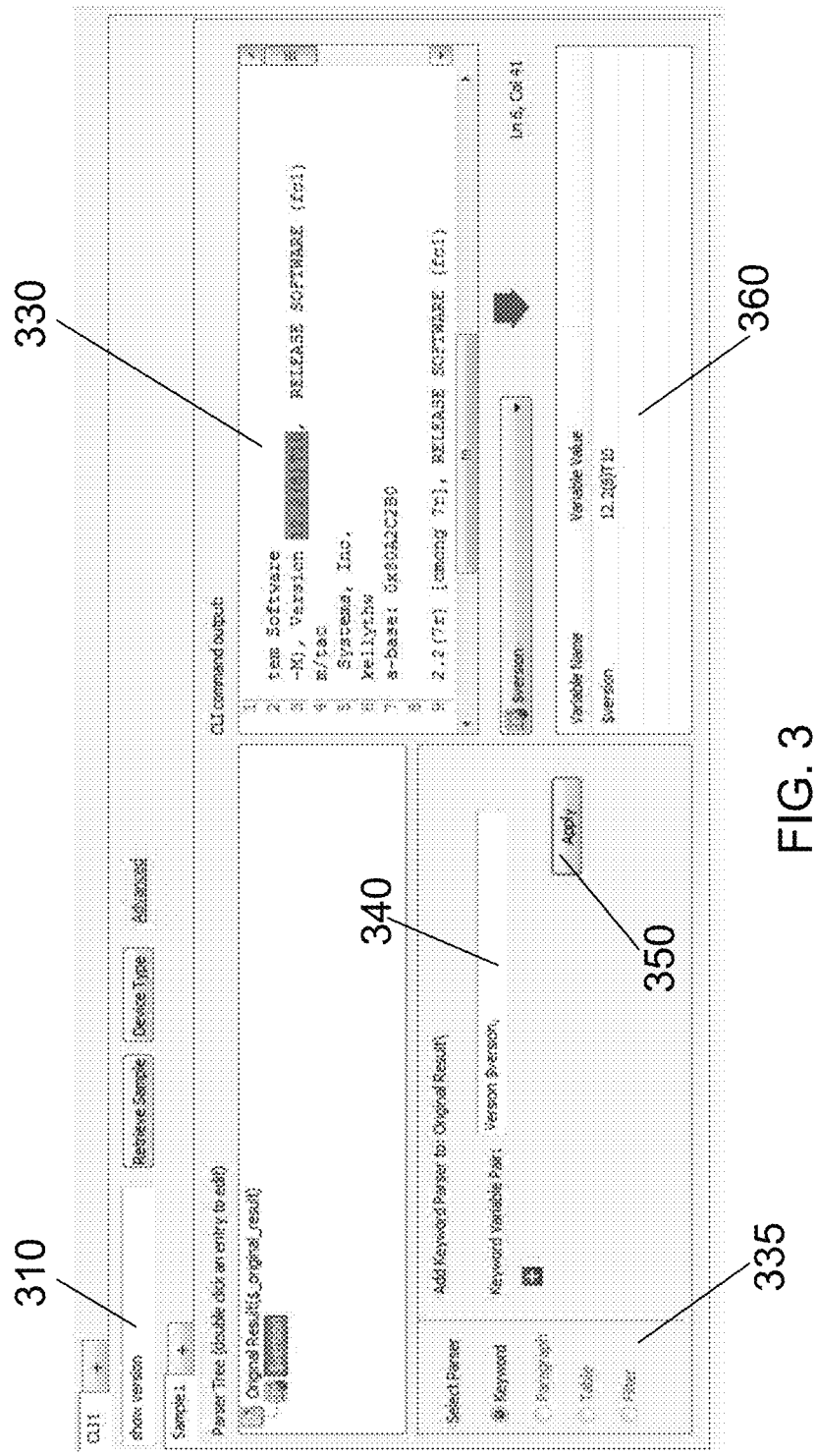
FIG. 3 shows an example User Interface for defining a Keyword Parser in accordance to this application.

FIG. 3 is an example user interface for defining a Parser Utility. The CLI command is used as an example. The same idea can be applied to any other type of commands such as SNMP, Traceroute and Ping.

A user performs these steps to define a Parser: 1) enter the CLI command in field 310, for example "show version" shown in this figure; 2) retrieve a sample output from the device of interest by clicking the Retrieve Sample button and select a device. The sample output is shown in field 330; 3) define a set of Parsers using Parser User Interface 335.

The Retrieve Sample function allows a user to see a real time device output in field 330. The sample output is used to help define the parser.

Parser user interface 335 defines how to retrieve data by the aid of a sample output, for example, four types of Parsers may be defined: Keyword, Paragraph, Table and Filter Parsers.

The Keyword parser is used to retrieve a single instance of data with the selected keyword as a marker for the start of the data. The Keyword Parser uses the unchanged keyword to identify the value and the value is saved into a variable. For example, to get the version number from the following sample output of "show version" command:

```
BST-CORE>show version
Cisco Internetwork Operating System Software
IOS (tm) 2500 Software (C2500-IK8OS-L), Version 12.2(29b), RELEASE SOFTWARE (fc1)
Copyright (c) 1986-2007 by cisco Systems, Inc.
Compiled Mon 30-Jul-07 16:46 by kellythw
Image text-base: 0x03070A14, data-base: 0x00001000
```

To guarantee accuracy, a user can copy and paste the exact text "Version 12.2(29b)," into the keyword variable field 340, leaving "Version" as is, to be the marker and replacing "12.2(29b)" with a variable "$version" to indicate to the Parser Utility that the text string following the text "Version" is to be collected as value and to be saved as a variable. After clicking the Apply Parser button 350, the matched value is immediately highlighted in the output sample in field 330 and the value is displayed in the pane 360 under the sample output, which verifies that the Keyword Parser is correctly configured.

A Keyword parser contains one or more keyword/variable pairs. A variable may start with $, or some other symbol as defined in the system. The example system prefers the use of $.

The variable can be of different types other than a string, for example, an integer or a floating number. In order to define other types of variables, you need to explicitly set its type using the syntax "$<type>:<name>", where "<name>" is the variable name and the "$<type>" can be "int" for an integer, or "double" for a floating number. For example, to define an integer variable named memory for the memory usage, you may need to define it as "$int:memory".

Besides the plain text keywords, the system also supports the Regular Expression for retrieving data value more precisely. For example, in the previous sample output, "regex [$double:major_version]:Version (.+?)\(" can be used to retrieve the major version (12.2). The reserve word "regex" indicates that the keyword/variable pair definition is a Regular Expression, not a normal text matching. The variable(s) defined here are placed inside the brackets, "[ ]". Multiple variables are separated by a comma, for example, "regex[$double:major_version, $minor_version]: Version (.+?)\((.+?)\)". The regular expression is defined after the colon, ":". The values to be captured are inside the parentheses, "( )", and assigned to the variables in order.

Figure 4:
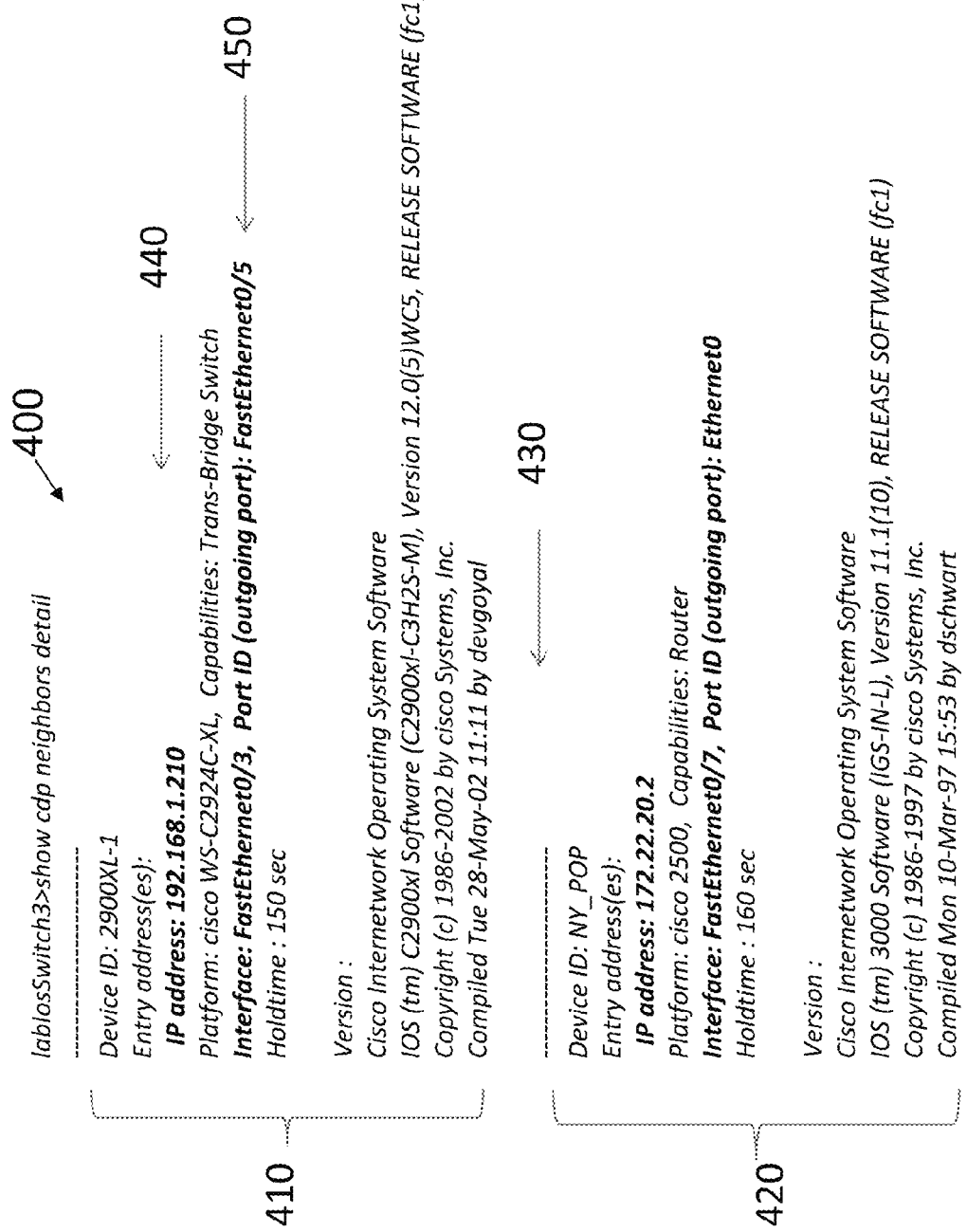
FIG. 4 is an example sample output containing paragraphs in accordance to this application.

The Paragraph Parser is used to retrieve multiple instances of data if similarly-formatted paragraphs are included in a data output, such as a sample output of the CLI command "show cdp neighbors" shown in FIG. 4.

A sample output 400 is collected. The sample output includes multiple paragraphs such as paragraph 410 and 420 separated by the line 430. The output of each paragraph has identical formatting. For example, all paragraphs includes the line 440 to show the IP addresses of the neighbor devices and line 450 to show the local interface and remote interface.

Figure 5:
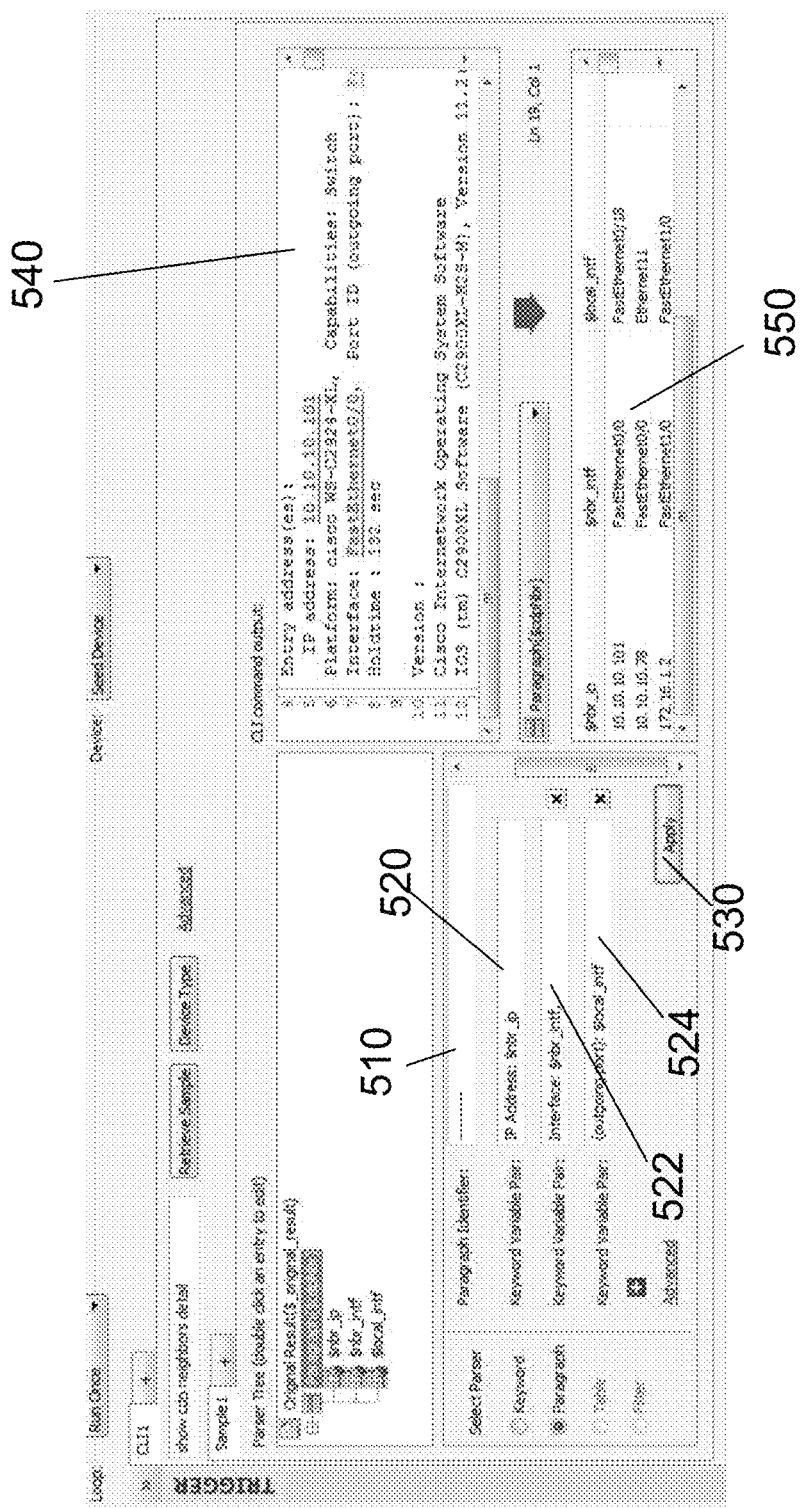
FIG. 5 shows an example User Interface for defining a Paragraph Parser in accordance to this application.

FIG. 5 shows how to define a Paragraph Parser to collect the IP addresses in each paragraph shown in FIG. 4. The Paragraph Identifier field 510 is filled with the paragraph keyword to identify the start of a paragraph, string value of line 430 "- - - " for the sample in FIG. 4 that indicates a start of a new paragraph. A Paragraph Parser can have multiple Keyword Parsers as child Parsers. The keyword variable pairs of these child Parsers are applied to each paragraph. In this example, we define three keyword variable pairs 520, 522 and 524:

IP Address: $nbr_Interface: $nbr_intf, and (outgoing port): $local_intf.

After clicking the Apply button 530 to save this Parser, the matched values are immediately highlighted in the sample output 540 and parsed results are shown as a table in pane 550. The immediate visualization of the parsing of the sample output enables the confidence that the Parser is functionally and correctly defined.

The system automatically creates a data container, a table for the parsed variables. It does not require the user to define the variables as the table data type. A table or array variables can be used like the standard singular variables inside an Executable Procedure. The system will automatically create the logic loops in the executable code whenever necessary.

Figure 6:
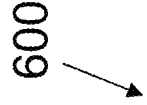
FIG. 6 shows a sample output with a table format in accordance with this application.

A Table parser is used to retrieve data from a table-formatted CLI command output such as the one sample output shown in FIG. 6.

The data output 600 is formatted as a table. It includes header rows 610 followed by data rows 620 and 630.

Figure 7:
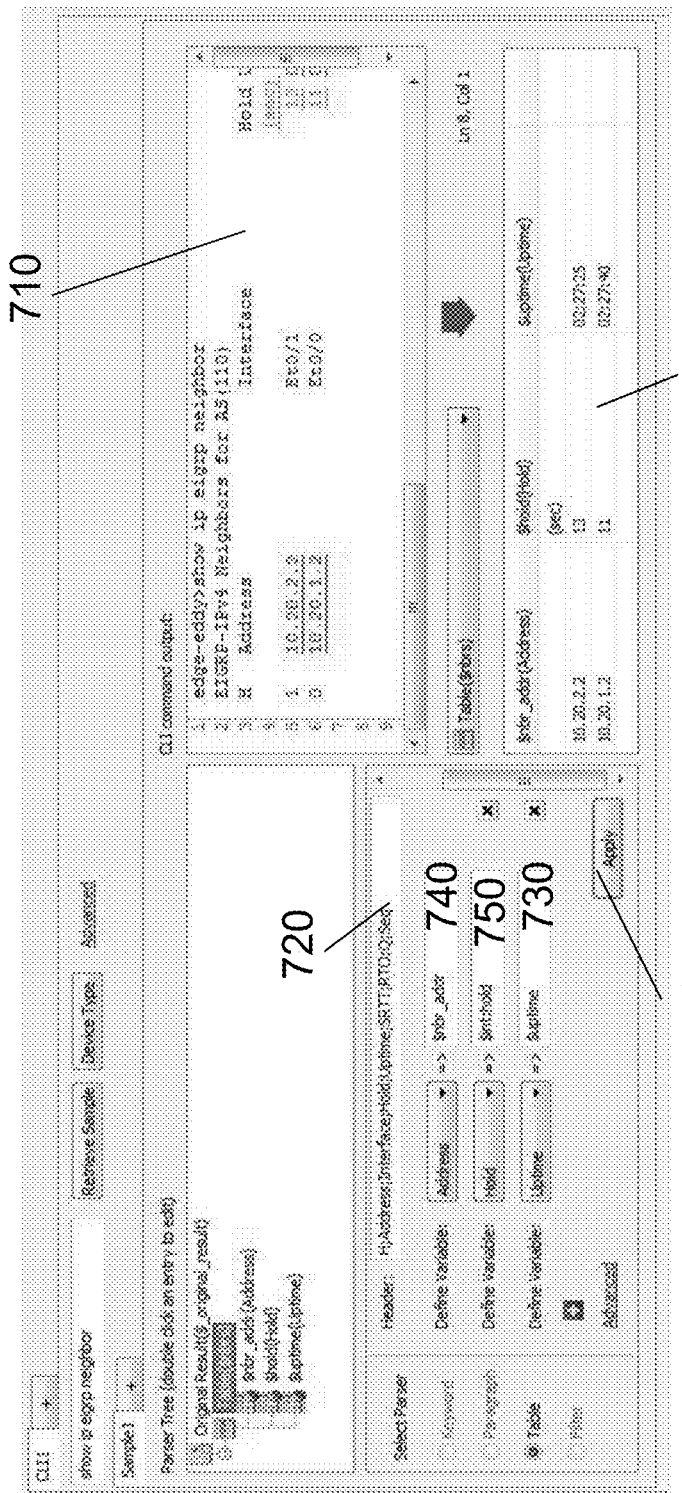
FIG. 7 shows an example User Interface for defining a Table Parser in accordance to this application.

FIG. 7 shows how to define a Table Parser. First simply copy and paste the text string of Header from the sample output 710 to the Header field 720. Remove the space between fields and add a semicolon (;) to separate each field. Then define the variables by simply selecting the header field and assign it to a field name, such as "Interface=>$nbr_int" 730, and "Address=>$nbr_addr" 740. The variable definition follows the same rules as the Keyword Parser, for example, set the variable type as "Hold=>$int:hold" 750.

By clicking Apply 760, the matched values are highlighted in sample output 760 and the parsed results are shown in pane 770.

Among the parsed results shown in pane 770, the first row shows "sec" also collected as data. This is because the header of this table is split into two lines. The advanced settings of the Table Parser can be used to skip the first line from the header.

Figure 8:
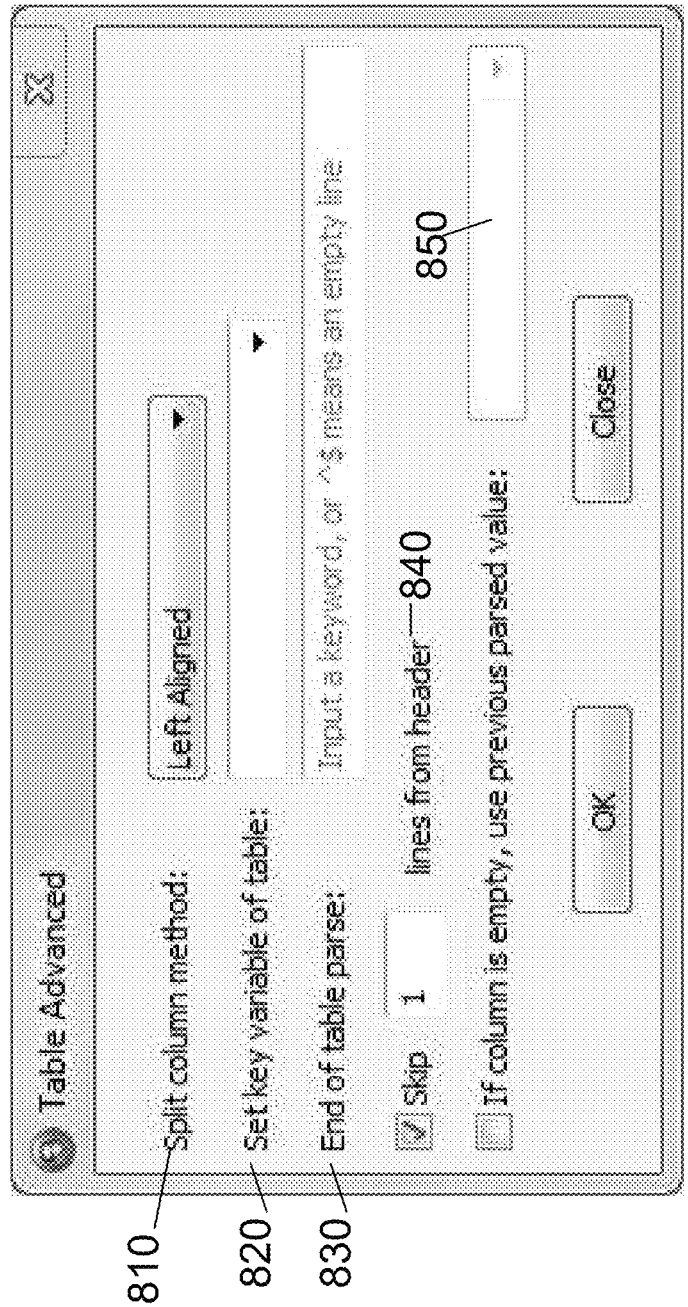
FIG. 8 shows an example User Interface for advanced setting in defining a Table Parser in accordance to this application.

FIG. 8 shows an advanced setting of the Table Parser. Split column method 810 specifies table alignment: left alignment, right alignment or by number of characters. Set key variables field 820 specifies the key variables for a table, which is used for the table comparison. End of table parse field 830 defines the keyword to match for the end of a table. This can be helpful since a table often has a summary at the end. Skip the defined number (n) of lines after the header 840 and it will not parse the first n lines after the header. Finally, the "If the column is empty, use the previous parsed value" field 850 takes care of this situation when a value is empty and asks the system to use the last parsed value.

Filter parser is used to filter partial data from the original output. For example, a user can filter EIGRP routing protocol configurations from the "show run" results.

Figure 9:
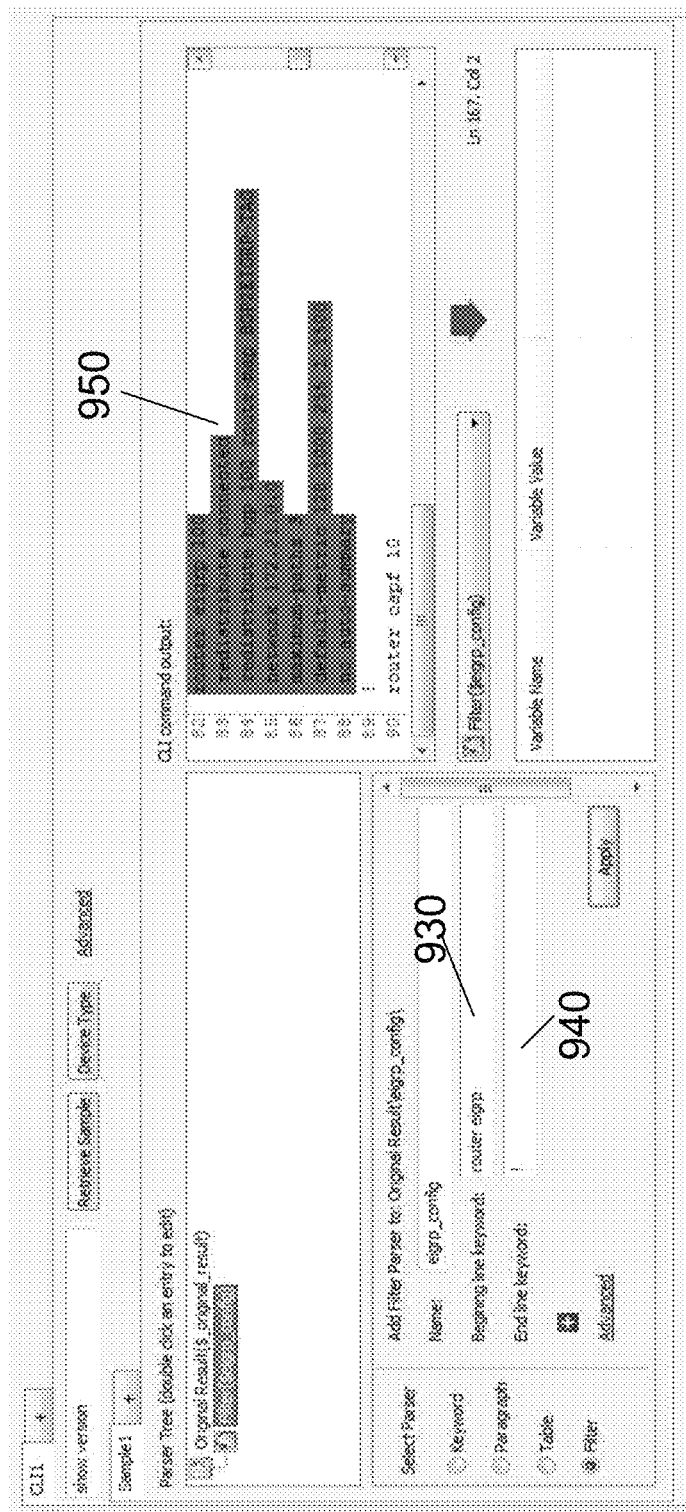
FIG. 9 shows an example User Interface for defining a Filter Parser in accordance to this application.

FIG. 9 shows how to define a Filter Parser. There are two options: use a built-in Design Reader (DR) filter to filter the configuration or create a standard filter. A DR is a built-in standard filter for common use cases.

A standard filter filters the data between a beginning line keyword specified in field 930 and an end line keyword specified in field 940. Within a Filter Parser you can add new Parsers (child parser), which can be of any type and is applied to the filtered data. The filtered data is immediately highlighted in window 950.

A Trigger analyzes the data retrieved by the Parsers. There are four types of Triggers:

Threshold Trigger: runs the Parser once and compares the variables with the threshold value. For example, compare the CPU of network devices with the threshold value such as 90%. If the CPU is larger than this value, a warning message is output.

Compare Trigger: runs the Parser against two data sources (live data and baseline data) and checks whether the variables change. For example, compare the configurations retrieved from the live network with the benchmarked configurations and output any difference.

Delta Trigger: runs the Parser twice with a certain time interval and checks whether the variables change. For example, retrieve CRC error of the network interfaces within a certain interval such as 5 seconds and if the CRC errors increase, output an error message indicating that the cable connected to this interface does not work properly.

Advanced Trigger: provides advanced options. Use this Trigger if the other triggers cannot complete the desired function.

The Threshold trigger is used to compare a variable defined in the parser with a threshold value. It supports the following control flow:

```
if ($var1 is None)
    action block 1
else if ($var1 >= threshold value 1)
    action block 2
else if ($var1 >= threshold value 2)
    action block 3
else
    action block 4
```

Here action blocks can include one or more messages, one expert advice block, a statement block, one block to export variables, and one control action block.

If the "$var1" is an array, the system automatically adds logic loops in this Threshold Trigger. Inside the logic loops, the system automatically loops through each element of the array. This same rule applies to all types of Triggers, except when using an advanced Trigger.

The Threshold Trigger can only compare one variable against the threshold value. For complex conditions involving two variables or involving "and" or "or" Boolean operations, use the Advanced trigger.

Figure 10:
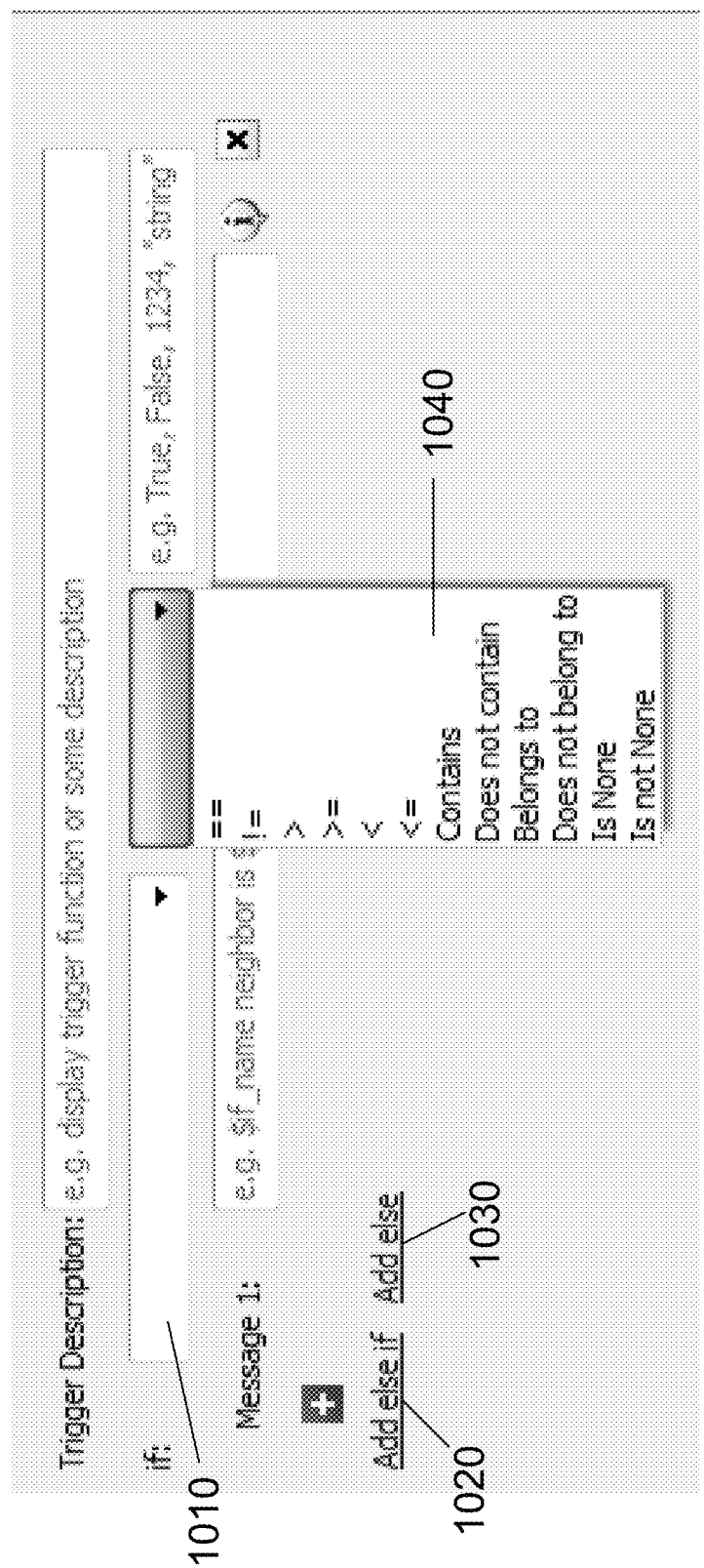
FIG. 10 shows an example User Interface for defining a Threshold Trigger in accordance to this application.

FIG. 10 shows a user interface of a Threshold Trigger. A threshold always includes one "if" condition 1010 and can have one or multiple "else if" conditions 1020 and "one else" conditions 1030. Twelve operations 1040 to compare the variables with the threshold value are supported by the threshold Trigger in the current implementation. The operations "==", "!=", "Is None" and "Is not None" can be applied to any type of variables. The operations ">", "<", ">=", "<=", "Belongs to" and "Does not belong to" can be applied to the integer and double type and the threshold value must be a number. The operations "Contains" and "Does not contain" can only be applied to the string variable.

The operators "Belongs to" and "Does not belong to" defines a range of numerical values such as "1-10; 50-80".

The Compare Trigger is used to compare whether a variable changes between two data sources (live data and baseline data). It supports the following control flow:

```
if ($var1. Change( ) Changed)\
    Action block 1
else
    Action block 2
```

The Delta Trigger is used to compare whether a variable changes within a certain time interval. The Parser is run twice within the time interval. The Delta Trigger supports the following control flow which is similar to the compare parser:

```
if $var1.delta( ) > value1
    Action block 1
else if $var2.delta( ) < value2
    Action block 2
else
    Action block 3
```

The Advanced Trigger can be used to implement a complex control flow which is too difficult to be implemented by the Threshold Trigger, for example:

```
If $var1 >= threshold_value and $var2 <= threshold_value2)
    Action block 1
else $var1 == value3 of $var2 < value4
    Action block 2
```

Figure 11:
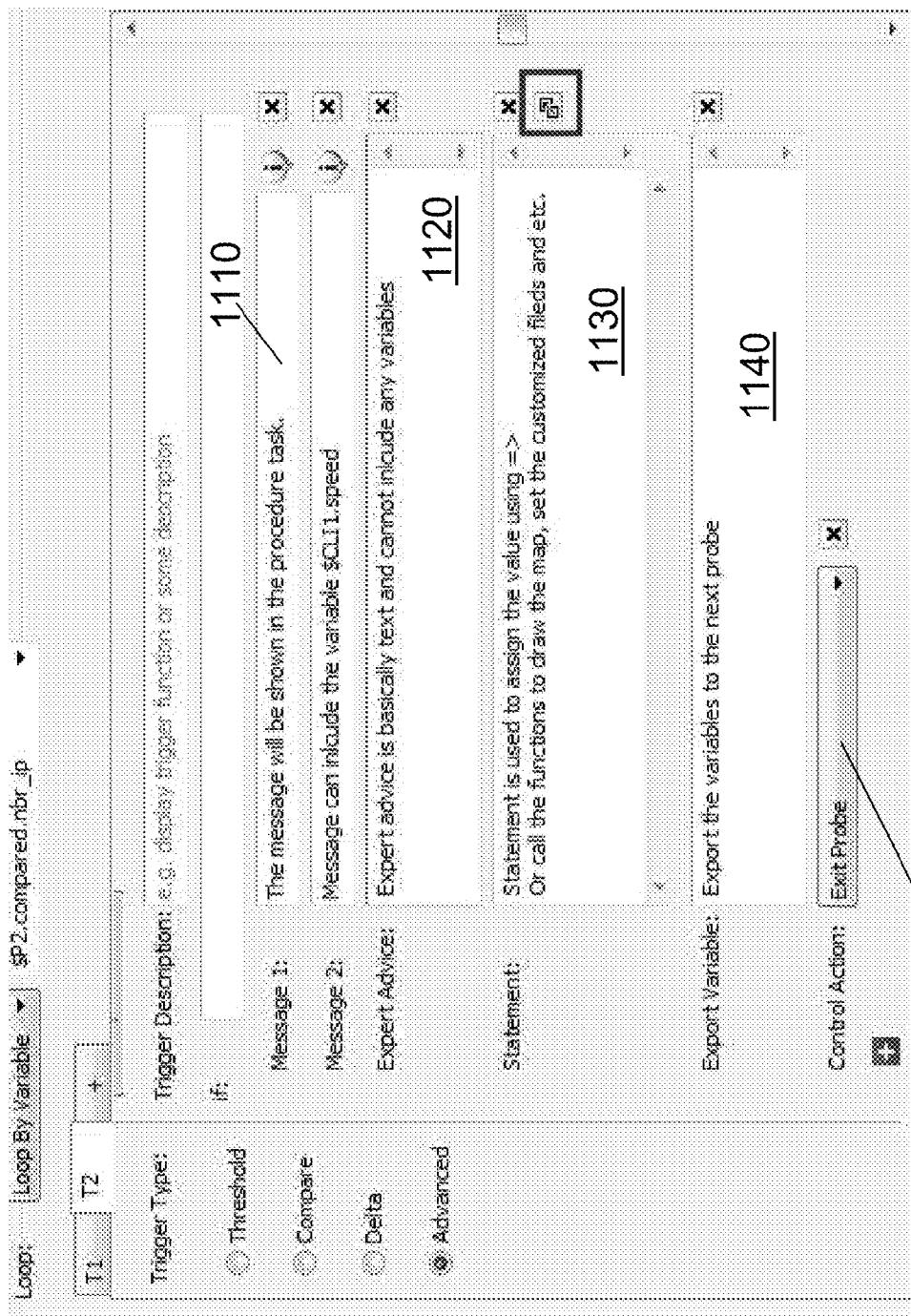
FIG. 11 shows an example User Interface for the action blocks of an Advanced Trigger in accordance with this application.

Under the "if", "else if" and "else" conditions is the action block, where a user can tell the system what to do under each condition. FIG. 11 shows all possible actions in an action block.

The message 1110 will be shown in the Message fields in the Procedure result window after the procedure is run. The message can include variables, and typically does.

The Expert Advice field 1120 is the pure text for the Procedure author to give advice if the condition occurs. It will be displayed in the Procedure Task window when the user views the detail of a message.

The Statement fields 1130 can be any code such as making function calls to draw in the map and creating customized fields for device properties.

The Export Variables field 1140 exports the variables to be used by the next probe.

Finally the Control Action 1150 asks the system to exit the probe and procedure.

All programming codes require certain loop controls to solve a non-trial problem. Executable Procedure is no exception. However, the loops are hidden from the user and automatically implemented while the system creates the executable codes from the user-defined Procedure.

Figure 12:
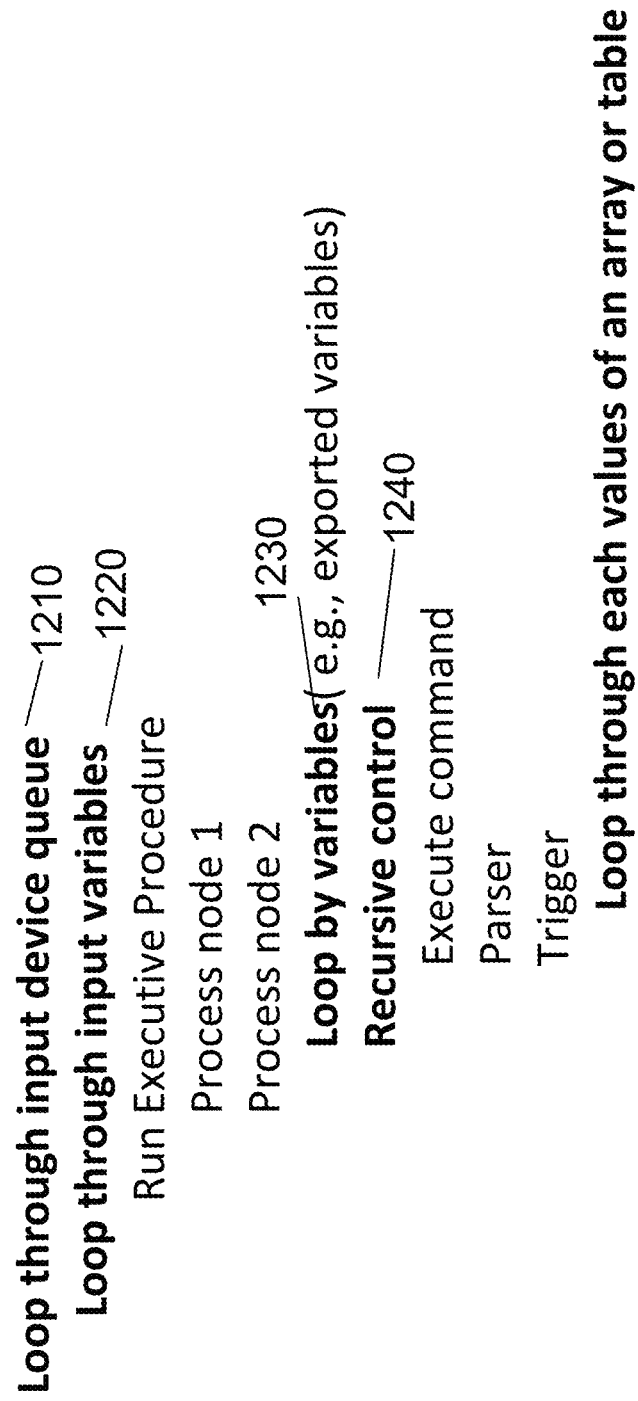
FIG. 12 shows an example logic loop that a Procedure automatically executes in accordance with this application.

FIG. 12 illustrates the hidden loops implemented by the system. For loop 1210, the procedure is run once for each of the seed devices. If the global input variables 1220 of the procedure have multiple values, the procedure will be run for each of the input variables. For example, an Executable Procedure to check whether the route to multiple destinations exists in core routers can take the multiple destinations as the global input variables and loop through each core device.

Inside the procedure, the user can select a process node to loop through a variable 1230, meaning that the Node will be run for each element of the variable. For example, to check whether the duplex of the neighbor interfaces are matched, the first Process Node of the procedure may get all CDP neighbors of a seed device and pass the CDP neighbor (which is a table) to the next Process Nodes. The second Process Node of the Procedure will loop through each local interface to retrieve the duplex. And the third Process Node of the Procedure loops through each remote interface to retrieve the duplex and do the comparison. Basically we have a loop such as:

For each local interface having the neighbor
Run Process node 2

Inside the Process Node, the system also provides a recursive control 1240 to recursively loop through the Process Node until a certain condition is satisfied. This option can be used to map out the topology from a seed device and discover the path.

Finally inside a Trigger, if the variable to be compared is an array or a table, the system automatically adds a loop.

The Procedure can be run in two modes: the debugging mode and the live mode. In the debugging mode, the system will show the flow, including all loops, and the values of loop variables. In the live mode, only the final results are displayed.

Figure 13:
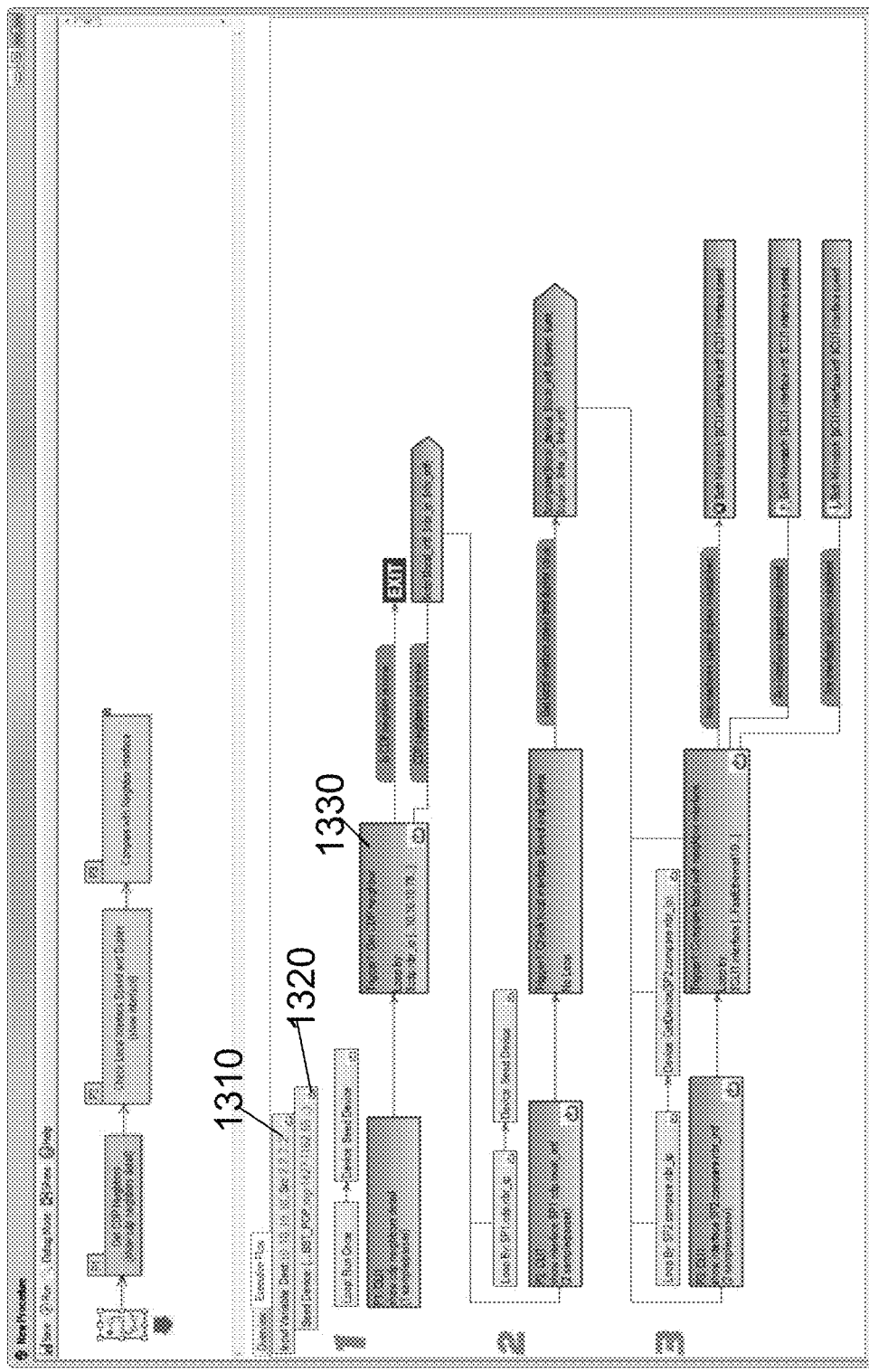
FIG. 13 shows an example output of a Procedure in debugging mode in accordance with this application.

FIG. 13 shows the output of a Procedure run in the debugging mode. The loop variables are displayed with the value in the current cycle. For example, the Procedure is looping through the input variable 1310 which is a table and has the value ("10.10.10.10", "2.2.2.2") in the current loop. The second loop is the seed device 1320. For the Process node 1, the Trigger 1 loops through the variable "$cdp.nbr_ip 1330".

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A sample-driven visual programming system for network management system, comprising:
   a computer processor wherein said computer processor executes a graphic computer program module to graphically manage a network system, said graphic computer program module further comprises:
   a sample collecting unit graphically on a screen available to a user that issues a network managing command and collects and displays on a screen a sample output data from a network device resulting from running said network managing command wherein said sample output data indicates a network running status of said network system; and
   a Parser Utility graphically on a screen available to a user who interacts with said sample output data to define a Parser using said sample output data, wherein said Parser Utility visually marks a set of features of said sample output data on screen in corresponding to a set of selected marking criteria by said user and processes the parsed data into a set of data variables.

2. The sample-driven visual programming system of claim 1, wherein said sample output data is collected in real time.

3. The sample-driven visual programming system of claim 1, wherein said Parser Utility includes a Keyword Parser, wherein a text-string is copied from said sample output data and defined as a Keyword marker that is used for collecting a value adjacent to said Keyword marker from a data output into said set of data variables.

4. The sample-driven visual programming system of claim 1, wherein said Parser Utility includes a Paragraph Parser, wherein a pair of paragraph border-strings are copied from said sample output data and defined as a paragraph marker that is used for marking and collecting data within a marked paragraph marked by said paragraph marker from a data output into said set of data variables.

5. The sample-driven visual programming system of claim 4, wherein said Paragraph Parser includes one or more child Keyword Parsers for further parsing a marked paragraph, wherein a text-string is copied from said sample output data and defined as a Keyword marker that is used for collecting a value adjacent to said Keyword marker into said set of data variables.

6. The sample-driven visual programming system of claim 1, wherein said Parser Utility includes a Filter Parser, wherein a pair of a beginning-string and an end string are copied from said sample output data and defined as a filter marker that is used for marking and collecting a data marked within said beginning-string to said end string from a data output into said set of data variables.

7. The sample-driven visual programming system of claim 1, wherein said Parser Utility includes a Table Parser, wherein a set of table headers are copied from said sample output data and defined as a table marker for a table to collect table data marked by said table marker from a data output into said set of data variables.

8. The sample-driven visual programming system of claim 1, said graphic computer program module further comprising:
   a visually graphic Trigger Utility available on a screen to a user that is configured to automatically encode a set of logic control flows and action loops using said set of data variables as triggering conditions for the set of logic control flows and action loops.

9. The Trigger utility of claim 8, wherein said Trigger Utility includes a Threshold Trigger which compares a data variable with a threshold value visually pre-specified by a user.

10. The Trigger utility of claim 8, wherein said Trigger Utility includes a Delta Trigger which checks a data variable within a time period visually pre-specified by a user.

11. The Trigger utility of claim 8, wherein said Trigger Utility includes a Compare Trigger which checks a data variable against a baseline data visually pre-specified by a user.

12. The sample-driven visual programming system of claim 8, said graphic computer program module further comprising:
   a graphic debugging system available on a screen to a user for displaying all action loops and its data variables for each action loop when the system is run in a debugging mode.

13. The sample-driven visual programming system of claim 1, said graphic computer program module further comprising:
   a set of graphic components available on a screen to a user which automatically add logic loops through an array or a table of variables for a list of network devices visually pre-specified by the user.

14. A sample-driven method for visual programming in network management, comprising the steps of:
   collecting a sample output data from a target device by issuing a network managing command using a graphic computer software module, wherein said sample output data indicates a network device running status of said network system;
   displaying said sample output data in text format on-screen;
   defining a Parser Utility graphically on a screen using said sample output data as a guide, wherein Parser Utility is defined by a set of markers identified from a sample output data;
   executing a network managing Procedure on the target device using said graphic computer software module;
   collecting and parsing an output data resulting from said step of executing said network managing Procedure, using said Parser Utility, into a set of data variables; and
   visually programming a Trigger Utility graphically available on screen to a user by using said set of data variables wherein a set of logic control flows and action loops are automatically encoded using said set of data variables as trigger conditions for the set of logic control flows and action loops.

15. The sample-driven method of claim 14, wherein said sample output data is collected in real time.

16. The sample-driven method of claim 14, wherein said Parser Utility includes a Keyword Parser, a Paragraph Parser, Filter Parser or Table Parser, or a combination thereof.

wherein for Keyword Parser, a text-string is copied from said sample output data as a Keyword marker for collecting a value adjacent to said Keyword marker from a data output into said set of data variables;

wherein for Paragraph Parser, a pair of paragraph border-strings are copied from said sample output data as a paragraph marker for collecting a data value within a marked paragraph marked by said paragraph marker into said set of data variables;

wherein for Filter Parser, a pair of a beginning-string and an end string are copied from said sample output data as filter marker for collecting a data marked within a boundary by said beginning-string to said end string into said set of data variables;

wherein for Table Parser, a set of table headers are copied from said sample output data as table marker to collect table data marked by said table marker into said set of data variables.

17. The sample-driven method of claim 14, wherein said Trigger Utility includes a Threshold Trigger, a Delta Trigger, a Compare Trigger, or a combination thereof, wherein the Threshold Trigger compares a data variable with a threshold value visually pre-specified by the user, the Delta Trigger checks a data variable within a time period visually pre-specified by the user, and the Compare Trigger checks a data variable against a baseline data visually pre-specified by the user.

18. The sample-driven method of claim 14, further comprising the step of:
   providing a set of graphic components included in said graphic computer module which automatically add logic loops through an array or a table of variables for a list of network devices visually pre-specified by the user.

19. The sample-driven method of claim 14, further comprising the step of:
   providing a graphic debugging system for displaying all action loops and its data variables for each action loop when the system is run in a debugging mode.

* * * * *